United States Patent
Sanders

(10) Patent No.: US 7,278,153 B1
(45) Date of Patent: Oct. 2, 2007

(54) CONTENT PROPAGATION IN INTERACTIVE TELEVISION

(75) Inventor: Mark Sanders, Carlisle, MA (US)

(73) Assignee: SeaChange International, Acton, MA (US)

(*) Notice: Subject to any disclaimer, the term of this patent is extended or adjusted under 35 U.S.C. 154(b) by 0 days.

(21) Appl. No.: 09/547,474

(22) Filed: Apr. 12, 2000

(51) Int. Cl.
- H04N 7/18 (2006.01)
- H04N 7/173 (2006.01)
- H04N 7/16 (2006.01)
- G06F 15/16 (2006.01)

(52) U.S. Cl. .......................... 725/115; 725/82; 725/92; 725/114; 725/144; 725/145; 709/217; 709/219

(58) Field of Classification Search .................. 775/91, 775/114, 116, 115; 709/100, 200, 201, 217, 709/203, 219
See application file for complete search history.

(56) References Cited

U.S. PATENT DOCUMENTS

| | | | | |
|---|---|---|---|---|
| 5,029,104 A | * | 7/1991 | Dodson et al. | 709/217 |
| 5,220,516 A | * | 6/1993 | Dodson et al. | 709/217 |
| 5,251,297 A | * | 10/1993 | Takayanagi | 345/530 |
| 5,253,275 A | * | 10/1993 | Yurt et al. | 375/122 |
| 5,351,075 A | * | 9/1994 | Herz et al. | 725/13 |
| 5,473,362 A | * | 12/1995 | Fitzgerald et al. | 725/92 |
| 5,537,585 A | * | 7/1996 | Blickenstaff et al. | 707/205 |
| 5,544,327 A | * | 8/1996 | Dan et al. | 709/234 |
| 5,550,577 A | * | 8/1996 | Verbiest et al. | 725/92 |
| 5,557,317 A | * | 9/1996 | Nishio et al. | 725/92 |
| 5,559,984 A | * | 9/1996 | Nakano et al. | 711/121 |
| 5,568,181 A | | 10/1996 | Greenwood et al. | |
| 5,586,264 A | * | 12/1996 | Belknap et al. | 725/115 |
| 5,619,247 A | * | 4/1997 | Russo | 725/104 |
| 5,652,613 A | * | 7/1997 | Lazarus et al. | 725/50 |
| RE35,651 E | * | 11/1997 | Bradley et al. | 380/20 |
| 5,815,662 A | * | 9/1998 | Ong | 395/200.47 |
| 5,875,300 A | | 2/1999 | Kamel et al. | |
| 5,898,456 A | * | 4/1999 | Wahl | 725/91 |
| 5,920,700 A | * | 7/1999 | Gordon et al. | 395/200.56 |
| 5,940,594 A | * | 8/1999 | Ali et al. | 709/203 |
| 6,064,980 A | * | 5/2000 | Jacobi et al. | 705/26 |
| 6,124,877 A | * | 9/2000 | Schmidt | 725/10 |
| 6,295,092 B1 | * | 9/2001 | Hullinger et al. | 348/468 |
| 6,324,182 B1 | * | 11/2001 | Burns et al. | 370/429 |

(Continued)

FOREIGN PATENT DOCUMENTS

EP 0 649 121 A2 * 4/1995

OTHER PUBLICATIONS

Brubeck, DW and Rowe, LA, "Hierarchical Storage Management in a Distributed VOD System", *IEEE Computer Society*, 3(3):37-47, 1996.

Dan et al., "A dynamic policy of segment replication for load-balancing in video-on-demand servers", *Multimedia Systems*, 3:93-103, 1995.

(Continued)

*Primary Examiner*—Scott E. Beliveau
*Assistant Examiner*—Son P Huynh
(74) *Attorney, Agent, or Firm*—Proskauer Rose LLP

(57) ABSTRACT

A process of propagates viewing assets on a system of video storages. The process includes copying a missing portion of a replica of a selected viewing asset onto a target video server. The act of copying is responsive to determining that a priority to propagate the selected asset to the target server is higher than a retention value of a replica of one or more viewing assets stored on the target server.

72 Claims, 11 Drawing Sheets

U.S. PATENT DOCUMENTS

| | | | |
|---|---|---|---|
| 6,339,786 B1* | 1/2002 | Ueda et al. | 709/217 |
| 6,378,130 B1* | 4/2002 | Adams | 725/95 |
| 6,438,596 B1* | 8/2002 | Ueno et al. | 709/226 |
| 6,473,902 B1* | 10/2002 | Noritomi | 725/91 |
| 6,530,082 B1* | 3/2003 | Del Sesto et al. | 725/9 |
| 6,763,523 B1* | 7/2004 | Sacilotto et al. | 725/91 |
| 6,785,768 B2* | 8/2004 | Peters et al. | 711/112 |
| 6,898,762 B2* | 5/2005 | Ellis et al. | 715/716 |
| 6,973,662 B1* | 12/2005 | Sie et al. | 725/25 |
| 2004/0210932 A1* | 10/2004 | Mori et al. | 725/39 |

OTHER PUBLICATIONS

Lie, PW and Lui, JCS, "Threshold-Based Dynamic Replication in Large-Scale Video-on-Demand Systems", *IEEE Computer Society*, 52-59, 1998.

Miyazaki et al., "Dynamic Coordination of Movies According to Popularity Index and Resource Availability within a Hierarchical VOD System", *IEEE Tencon*, 199-202, 1997.

Venkatasubramanian, N and Ramanathan, S, "Load Management in Distributed Video Servers", *IEEE Computer Society*, 528-535, 1997.

International Search Report.

\* cited by examiner

| Elist ID | Selected Element | RV | Size | Elements | Assets |
|---|---|---|---|---|---|
| 1' | F | 60 | 10 | F | 3 |
| 2" | A or B | 5 | 40 | A,B | 1 |
| 4' | G or H | 42 | 50 | G,H | 4,5 |
| 3" | C | 65 | 70 | A,B,C,F | 1,3 |

| Elist ID | Selected Element | RV | Size | Elements | Assets |
|---|---|---|---|---|---|
| 1' | F | 60 | 10 | F | 3 |
| 2' | B | 5 | 20 | B | 1 |
| 3' | D or E | 25 | 35 | D,E | 2 |
| 4' | G or H | 42 | 50 | G,H | 4,5 |
| 5' | C | 65 | 50 | B,C,F | 1,3 |
| 6' | A or I | 30 | 100 | A,I,D,E,B | 1,2 |

FIG. 9A

| Elist ID | Total RV | Total Size |
|---|---|---|
| 2' | 5 | 20 |
| 3' | 25 | 35 |
| 2',3' | 30 | 55 |
| 6' | 30 | 100 |
| 2',6' | 35 | 120 |
| 4' | 42 | 50 |
| 2',4' | 47 | 70 |

FIG. 9B

CONTENT PROPAGATION IN INTERACTIVE TELEVISION

TECHNICAL FIELD

This invention relates to interactive television.

BACKGROUND

Interactive television systems provide viewers with network access to video servers that offer a large plurality of viewing selections. To make a viewing selection, a viewer looks at a menu transmitted by the system and selects a viewing asset. The viewer issues a request for the selected asset through a network that connects his or her television to the interactive television system. In response to receiving the viewer's request, the interactive television system uses the network to stream the requested asset from one of the video servers to the viewer's television. The collection of video data objects and related data objects such as posters, descriptions, and preview objects, may together form a complete viewing asset. In an interactive television system, the selection of available viewing assets is preferably large. Furthermore, the viewing assets themselves often include large video data objects. The desire to offer large selections to viewers means that such systems need very substantial data storage resources for viewing assets.

An interactive television system may store a large amount of asset data on an array of servers. Typically, only a subset of the servers is accessible to a single viewer, because one server cannot server every viewer. In such a system, an individual asset may have to reside on several servers so that different viewers can access the asset.

The collection of accessible assets may also change over time. Changes to the collection of assets may respond to asset popularity shifts and/or viewing population changes.

SUMMARY

In one aspect, the invention features a process of propagating viewing assets on a system of video storages. The process includes copying a missing portion of a replica of a selected viewing asset onto a target video server. The act of copying is responsive to determining that a priority to propagate the selected asset to the target server is higher than a retention value of a replica of one or more viewing assets stored on the target server.

In some embodiments, the act of copying includes writing the missing portion of the replica of the selected asset onto a storage region of the target video server that previously stored a portion of the replica of one or more viewing assets. The copying may include reading the missing portion from video servers that serve viewers.

In some embodiments, the act of selecting a portion of the replica of one or more viewing assets is responsive to the replica of one or more viewing assets having a data size at least as large as a data size of the missing portion of the selected asset.

In some embodiments, the process also includes assigning priorities to propagate to a plurality of viewing assets, ranking the viewing assets according to the assigned priorities, and choosing the selected asset for copying in response to the selected asset being ranked above a preselected minimum rank.

In a second aspect, the invention features a process for propagating digital viewing assets to video servers. The process includes assigning to each of a plurality of digital viewing assets a priority to propagate the asset onto video servers, ranking the assets based on the assigned priorities; and propagating one of the assets to one or more selected video servers. The act of propagating is responsive to the one of the assets having a preselected minimum ranking.

In some embodiments, the act of assigning includes assigning a viewing asset to a usage class. The usage class provides a contribution to initial values of the priorities to propagate assets assigned to the class.

In some embodiments, the process further includes accumulating usage data on individual assets stored on the video servers and updating the priorities to propagate based on the usage data. The usage data may include numbers of viewer requests during predetermined time periods and differences between numbers of viewer requests during earlier and later predetermined periods.

In a third aspect, the invention features a process for propagating viewing assets onto a video storage. The process includes assigning propagation priorities to viewing assets, constructing a table of element deletion lists for a target video storage, and selecting a group of element deletion lists from the table. The group has a data size at least as large as a data size of a portion of a replica of another asset not stored on the target storage. The process also includes copying the portion of a replica of the other asset onto the target video storage in response to the propagation priority of the other asset being larger than a retention value of the group.

In some embodiments, the act of copying includes writing the portion onto a region of the target video storage previously storing the group.

In some embodiments, the act of selecting a group includes constructing a table listing sets of element deletion lists with lower retention value than the priority of the other asset. The act of selecting includes picking one of the lists having a data size at least as large as the portion of the replica of the other asset.

In a fourth aspect, the invention features a process of distributing viewing assets to viewers. The process includes assigning priorities to assets, selecting a video server, and copying one of the assets onto the video server. The priorities are priorities for distributing the associated assets to video servers accessible to viewers. The act of copying is responsive to determining that the priority associated with the one of the assets is greater than a retention value associated with a set of viewing assets having replicas on the video server. The replicas occupy enough space to store the one of the assets.

In some embodiments, the copying includes searching for one or more sets of replicas of asset elements to delete on a table of element deletion lists.

In some embodiments, the process further includes accumulating data on usage of individual ones of the assets. Then, the act of updating is based at least in part on the accumulated data.

In a fifth aspect, the invention features an interactive television system. The system includes a network or bus, a plurality of video servers to store digital replicas of viewing assets for viewers, and a control unit connected to the video servers. The video servers are connected by the network or bus. The control unit orders copying of a missing portion of a replica of a selected asset to one of the video servers if a priority to propagate the selected asset onto the one of servers is higher than a value of retaining a replica of one or more other assets already stored on the target server.

In some embodiments, the system also includes a plurality of distribution networks to provide channels for delivering viewing assets to viewer televisions. Each distribution network connects to portion of the video servers.

In a sixth aspect, the invention features a process for propagating digital viewing assets onto video servers. The process includes propagating a plurality of viewing assets onto video servers based on priorities to propagate, accumulating usage data on individual assets stored on the video servers, and updating the priorities based on the usage data. The priorities provide a ranking of the assets.

In some embodiments, the process includes assigning a viewing asset to a usage class that provides a portion of an initial value for the priorities to propagate the assets assigned to the class. The process may also include calculating the priority to propagate a selected one of the assets onto one of the video servers. The calculation may be based on a global priority to propagate the selected one of the assets and a local priority to propagate a replica of the selected one of the assets onto the one of the video servers. The global priority may be based in part on a counter value that measures usage of the selected one of the assets. The local priority may be based in part on a bandwidth for streaming the selected one of assets from the one of the video servers to a set of viewers.

In various aspects, the invention features a data storage media storing a computer executable program of instructions for performing one or more of the above-mentioned processes.

Other features, objects, and advantages of the invention will be apparent from the description and drawings, and from the claims.

DESCRIPTION OF DRAWINGS

FIG. 9A is a table showing the ELists shown in FIG. 8B;

FIG. 9B is a table that enumerates "combinations of ELists" from FIG. 9A with retention values below 50;

Like reference symbols in the drawings indicate like elements.

DETAILED DESCRIPTION

Interactive Television System

Figure 1:
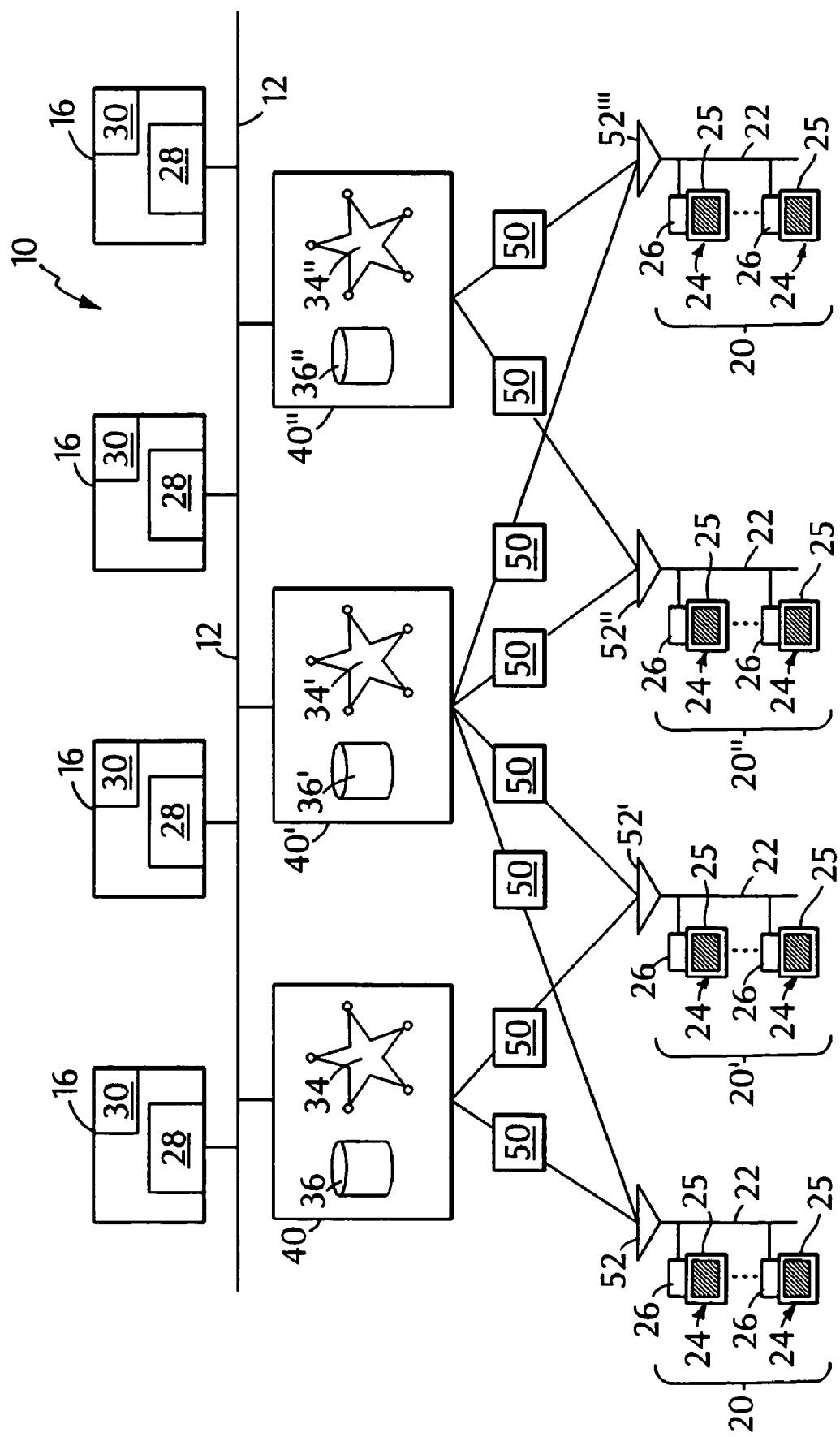
FIG. 1 is a block diagram of an interactive television system.

FIG. 1 shows a networked system 10 that provides interactive television to subscribing viewers. The system 10 includes a set of control units 16. The control units 16 connect to each other through a multi-channel communications bus 12. In some embodiments, the bus 12 may be a network. The bus 12 also couples a plurality of media clusters 40, 40', 40", which store replicas of viewing assets for viewers. The media clusters 40, 40', 40" couple to node groups of local viewers 20, 20', 20", 20'" through hybrid fiber coaxial (HFC) networks 22, which function as broadband or multi-channel broadcast networks for the local node groups 20, 20', 20", 20'". The HFC networks 22 carry viewing assets from the media clusters 40, 40', 40" to interactive viewer televisions 24 and carry viewing status data and viewing requests from the televisions 24 up to the media clusters 40, 40', 40" and control units 16.

The arrangement of control units 16 and media clusters 40, 40', 40" may serve a large number of viewers. For example, each media cluster 40, 40', 40" may serve between about ten to fifty thousand local viewers. The connectivity between individual media clusters 40, 40', 40" and individual node groups 20, 20', 20", 20'" may differ from cluster to cluster. For example, the media cluster 40 couples to node groups 20 and 20' while the media cluster 40" couples to node groups 20" and 20'". Thus, different viewers may be served by different subsets of the media clusters 40, 40', 40".

Each interactive viewer television 24 includes a set top box 26 that connects a normal television 25 to the local HFC network 22 and provides an interface for communicating with a portion of the media clusters 40, 40', 40" and control units 16. The set top boxes 26 receive viewing assets from the associated HFC networks 22, decode the received assets, and display the decoded assets on a normal television 25. In some embodiments, the set top boxes 26 may be integrated into the televisions 25. The set top boxes 26 also receive menus of available viewing assets, display the menus on the normal televisions 25, and transmit viewer requests for viewing assets and streaming-control commands to the control units 16. The streaming-control commands implemented by the set top boxes 26 may include stop, pause, fast-forward, and reverse.

The viewing assets are sequences of encoded digital files for video, text, audio, graphic, and/or interactive control applications. Each file of the sequence, for a viewing asset, will be referred to as an asset element. The displayed viewing assets may, for example, be movies, newscasts, shopping emissions or interfaces, posters, or audio presentations.

Each control unit 16 includes a computer 28, a data storage media 30, e.g., a hard drive or compact disk, for storing software processes executable by the computer. The control units 16 manage viewing assets on the media clusters 40, 40', 40" and control delivery of these assets to viewers. The management of assets includes propagating assets among the media clusters 40, 40', 40" and accumulating asset usage data to insure that the propagation of assets to the media clusters 40, 40', 40" anticipates viewer demand. The controlling asset delivery includes receiving, viewing requests from individual interactive televisions 24 and assigning asset delivery pathways from the media clusters 40 to the node groups 20, 20', 20", 20''' corresponding to requesting viewers.

Each media cluster 40, 40', 40" stores replicas of viewing assets that are currently available to the node groups 20, 20', 20", 20''' connected to the media cluster 40, 40', 40". The selection of viewing assets varies from media cluster to media cluster 40, 40', 40". The media clusters 40, 40', 40" stream viewing assets to associated local node groups 20, 20', 20", 20''' in response to control commands received from the control units 16. The control units 16 send such control commands in response to receiving requests for viewing assets from the various node groups 20, 20', 20", 20'''.

Each media cluster 40, 40', 40" has space for storing a limited number of replicas of viewing assets. The media clusters 40, 40', 40" store assets for meeting present and near-future viewing demands. To handle changing viewing demands, the control units 16 regularly update the asset selection on the media clusters 40, 40', 40" by copying replicas of new viewing assets to the media clusters 40, 40', 40" and/or by copying viewing assets between different media clusters 40", 40, 40'. To propagate an asset, a control unit 16 first copies a replica of a new asset to a preselected one of the media clusters 40, 40', 40" and then orders cluster-to-cluster copying to propagate the asset to other clusters 40, 40', 40". The control units 16 update the viewing asset selection on the media clusters 40, 40' 40" to maximize the economic value that the entire asset collect provides to the system 10 as is explained below.

Though the system 10 of FIG. 1 is not hierarchical, other embodiments may use hierarchical organizations of media clusters and/or control units, e.g., in master-slave relationships. In those embodiments, master servers control slave servers and provide for larger video storages. Several hierarchical organizations of media clusters or video servers are described in U.S. Pat. No. 5,862,312 and U.S. patent application Ser. No. 09/293,011, filed Apr. 16, 1999, which are both incorporated by reference herein.

Figure 2:
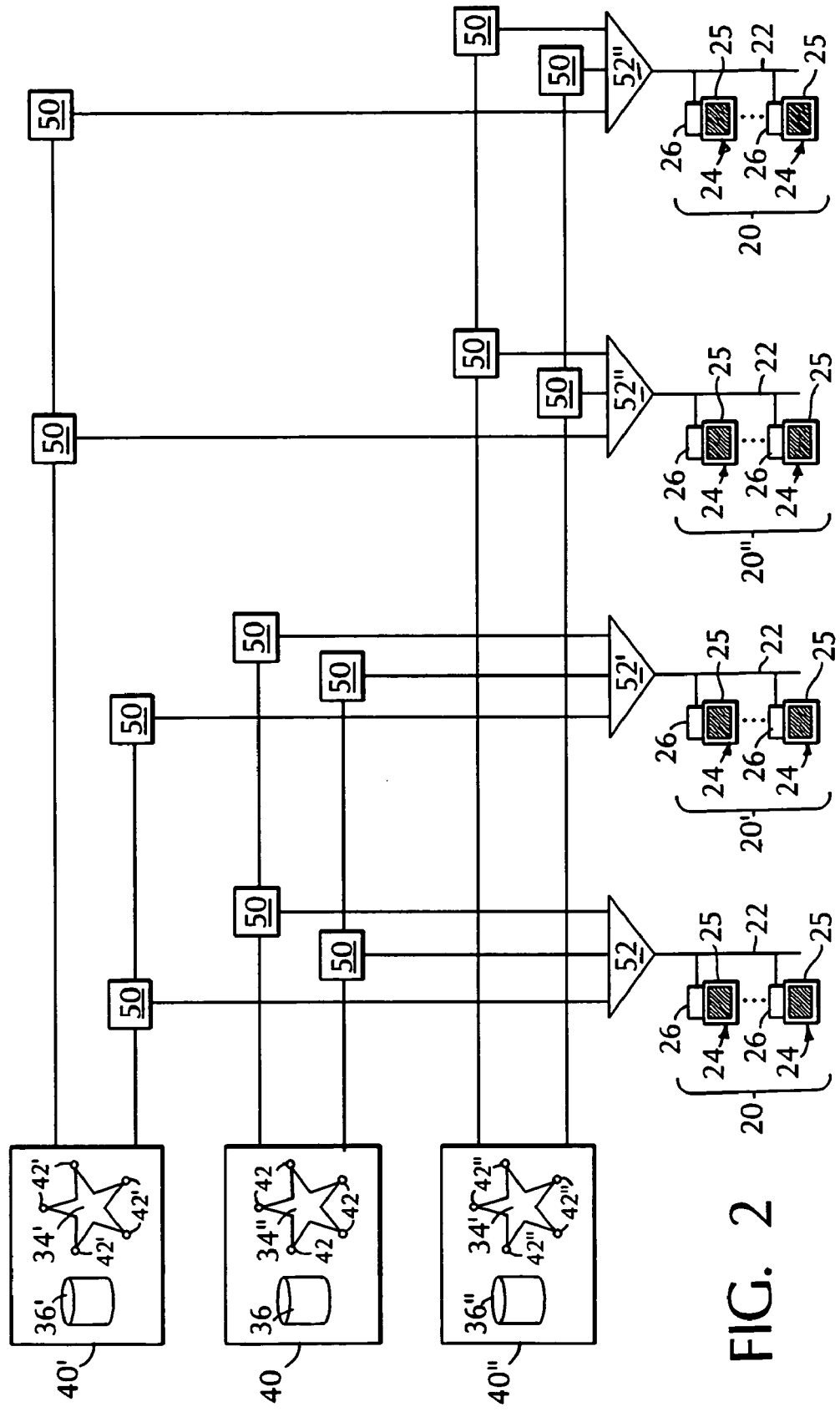
FIG. 2 illustrates asset delivery pathways of the media clusters shown in FIG. 1.

FIG. 2 shows media clusters 40, 40', 40" in more detail. Each media cluster 40, 40', 40" has several video data servers 42, 42', 42" that locally interconnect through a network or bus 34, 34', 34". The servers 42, 42', 42" of the same cluster 40, 40', 40" share a data storage 36, 36', 36", which may be physically lumped or spread over the individual local servers 42, 42', 42". The servers 42, 42', 42" delivery viewing assets from the cluster video storages 36, 36', 36" to node groups 20, 20', 20", 20''' connected to the associated media cluster 40, 40', 40". The video data storages 36, 36', 36" store replicas of the viewing assets, which the media cluster 40, 40' can deliver to local node groups 20, 20', 20", 20'''. The selection of replicas of assets stored on different clusters 40, 40', 40" may differ so that different media clusters 40, 40', 40" do not generally provide identical viewing selections to the locally connected node groups 20, 20', 20", 20'''.

FIG. 2 also shows some of the delivery pathways between various media clusters 40, 40', 40" and local node groups 20, 20', 20", 20'''. Each delivery pathway includes one of the servers 42, 42', 42", an output card of the server, a quadrature amplitude modulator (QAMs) 50, a combiner 52, 52', 52", 52''' and an HFC 22 that connects the destination node group 20, 20', 20", 20'''. The servers 42, 42', 42" have one or more output cards, which produce streams of digital data packets for transporting viewing assets to the node groups 20, 20', 20", 20'''. The output streams are received by QAMs 50 that connect to the output cards. Each QAM 50 reads headers of received packets and retransmits the packets towards the node group 20, 20', 20", 20''' served by the QAM 50 if that node group 20, 20', 20", 20''' is a destination of the packet. The retransmitted packets are received by combiners 52, 52', 52", 52''', which send broadband transmissions from several QAMs 50 to the associated node groups 20, 20', 20", 20''' via the associated HFC 22.

Referring again to FIG. 1, the different media clusters 40, 40', 40" may have different delivery pathways to the node groups 20, 20', 20", 20'''. The control of delivery of viewing content over these delivery pathways and the management of replicas of assets stored on the media clusters 40, 40', 40" are both performed by the control units 16. The control units 16 execute processes that perform these functions and are able to manage in excess of ten thousand assets and a variety of control application types. An individual control unit 16 may perform the above-functions for some or all of the media clusters 40, 40', 40".

Processes Controlling Assets

Assets are the smallest viewable objects that can be requested by or streamed to viewers. Replicas of assets can be activated or deactivated on the media clusters 40, 40', 40". An asset may include several elements, e.g., consecutive portions of a movie, a movie poster, and a movie trailer. The elements of an asset are individual files and are the smallest data objects that can be copied to or deleted from a media cluster 40, 40', 40". Physical copies of assets and asset elements on particular media cluster 40, 40', 40" are referred to as replicas of assets and replicas of asset elements, respectively.

Figure 3:
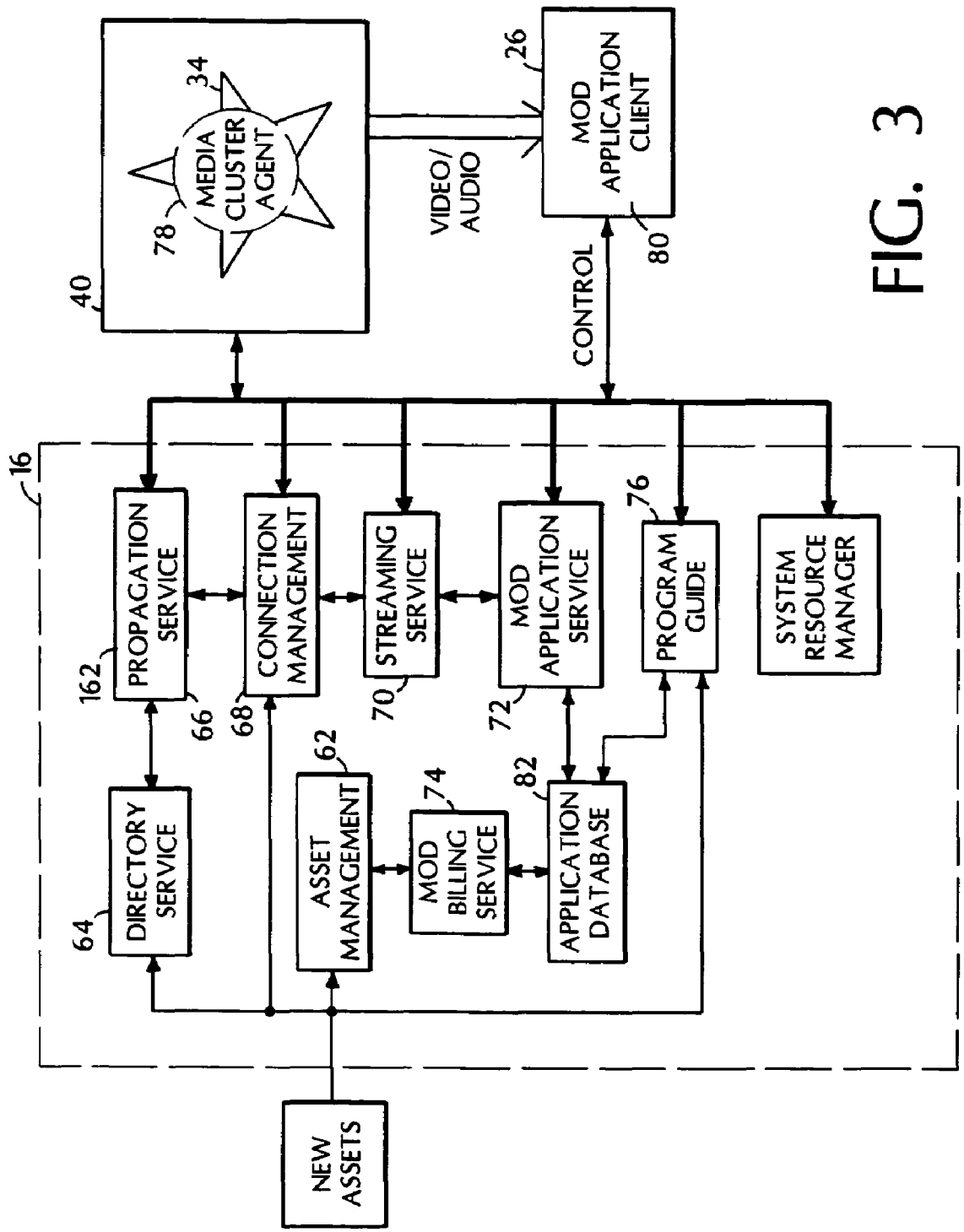
FIG. 3 is a high-level block diagram of software processes that manage and control the interactive television system of FIG. 1.

FIG. 3 is a block diagram showing software processes executed by the computers 28 of the control units 16 to manage and control viewing assets and asset usage in the interactive television system 10 shown in FIG. 1. On each control unit 16, the processes include modules 62, 64, 66, 68, 70, 72, 74, 76, which perform asset management, directory service, propagation services, connection management, streaming services, movies-on-demand (MOD) control application services, MOD billing services, and program guide services. In some embodiments, other processes may provide control application services and billing services for content types, such as news-on-demand (NOD), interactive shopping, and interactive games (not shown). On each media clusters 40, 40', 40", resident processes include an instance of a media cluster agent 78. On the set top boxes 26, resident processes include one or more application agents 80, e.g., a MOD application agent.

Figure 4:
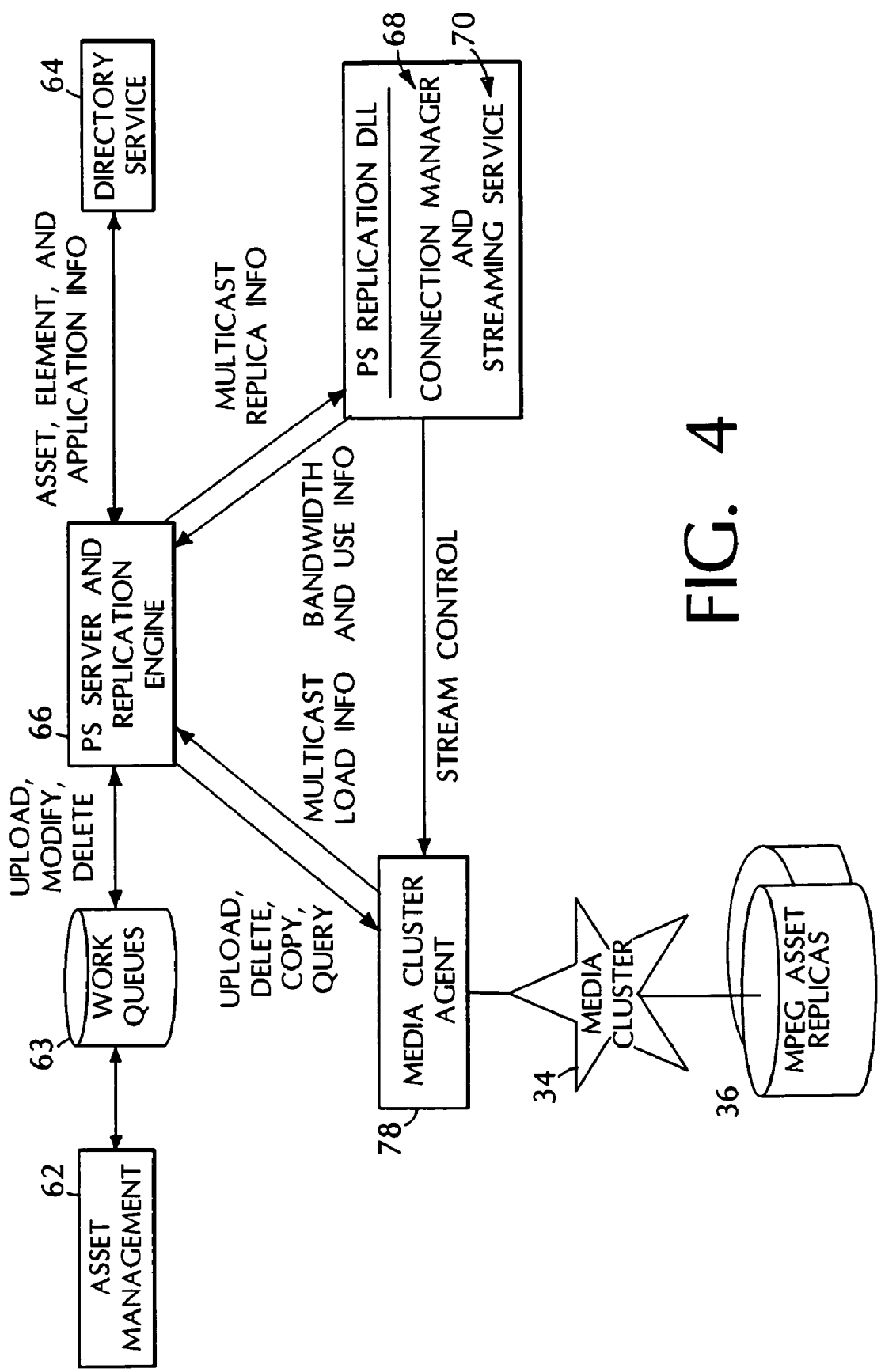
FIG. 4 illustrates interactions between a propagation service process and other processes of FIG. 3.

FIG. 4 illustrates functional relationships between the software process modules 62, 64, 66, 68, 70, 78 that manage and control assets. These relationships are further described below.

The asset management module 62 provides an interface for receiving new viewing assets into the control unit 16. The interface may, e.g., support automated downloads of viewing assets from a distribution cable (not shown) and/or manual uploads of viewing assets under control of a user operating a graphical user interface. For each newly received asset, the asset management module 62 creates an automated work queue 63 that controls the life cycle of the associated asset. The work queues 63 control the life cycle transitions performed by the propagation service (PS) module 66. An asset's life cycle may include states such as received;

encoded; stored on some media clusters 40, 40', 40"; activated; deactivated; and deleted.

The asset management module 62 accepts several types of data objects including encoded data files, e.g., encoded according to the Movie Picture Experts Group (MPEG) standards, non-encoded data files, executable applications, and metadata associated with other assets. The received data assets may be for video, audio, text, graphics, or interactive applications.

The directory service module 64 provides assets with filenames arranged in hierarchical namespaces. The directory service module 64 keeps information about the element composition of assets and metadata associated with assets.

In various embodiments, the control applications may include movies on demand (MOD), television on demand (TVOD), news on demand (NOV), interactive shopping and others.

The propagation service module 66 controls copying of assets to and deleting of assets from individual media clusters 40, 40', 40". A media cluster 40, 40', 40" needs a replica of each element of an asset to be able to play the asset to viewers. But, replicas of different assets may share replicas of some asset elements stored on the same media cluster 40, 40', 40".

The propagation service module 66 orders copying of new assets to a preselected one of the media clusters, e.g., cluster 40. The propagation service module 66 also orders copying of the asset replica to other ones of the media clusters, e.g., clusters 40', 40", to meet anticipated user demand for the assets, e.g., demands that are upcoming in the next few hours. The propagation service module 66 also provides location information on active replicas of assets to the other process modules 64, 68, 70.

The connection manager module 68 selects pathways for streaming viewing assets from media clusters 40, 40', 40" storing replicas of the viewing assets to viewers requesting the viewing assets. To optimize streaming, the connection manager module 68 uses an abstract representation of each potential delivery pathway. The representations indicate throughputs and bottlenecks along each pathway. The connection manager module 68 selects pathways with the highest available throughputs, i.e. the least restrictive bottlenecks, as the pathways for delivering assets to requesting viewers.

The connection manager module 68 also provides the abstract representation of delivery pathways for the propagation service module 66. This representation indicates available total bandwidths for delivering various viewing assets to local node groups 20. The propagation server module 66 uses this representation to determine when the available bandwidth for delivering an asset to viewers is so diminished that an additional replica of the asset is needed on another media cluster 40, 40', 40". The connection manager module 68 provides the representations of delivery pathways between media clusters 40, 40', 40" and node groups 20, 20', 20", 20'" to other ones of the software modules.

The connection manager module 68 is also an interface that receives requests for assets from viewer televisions 24 and set top boxes 26.

The streaming service module 70 provides application-independent streaming services to the connection management module 68, control application service modules 72, and media cluster agents 78. The provided services include stream creation, operation, and tear down of delivery pathways. The streaming service module 70 also has interfaces for controlling media cluster agents 78 that reside on the individual media clusters 40, 40', 40".

The media cluster agents 78 copy new replicas of asset elements to and delete old replicas of asset elements from the associated media clusters 40, 40', 40" in response to commands or orders from the propagation service module 66.

The MOD application service module 72 resides on the control unit 16 and controls processing of viewer requests to purchase movies and other on-demand video assets. The MOD application server module 72 interacts with an application database 82 and the MOD billing service module 74 to check viewer credit status and to bill virtual video rentals. The MOD application service module 72 can suspend or resume asset streaming to viewers, monitors viewing progress, and records viewer activities in the database 82.

The MOD application client 80 resides on each set top box 26 and provides a viewer with system navigation interface for requesting a programming guide and requesting assets for viewing. The interface transmits a viewer's requests to one of the control units 16.

The program guide service module 76 provides program guide files to set top boxes 26, which in turn displays a program guide on the attached normal television 25. Viewers can request assets in the program guide for viewing.

For each media cluster 40, 40', 40" serviced, the propagation service module 66 generates and regularly updates a table 162 of element deletion lists (ELists). In the table, each EList is identified by a "selected element" belonging to the EList. Each EList indicates a set of replicas of elements that can also be deleted if the identified selected element is deleted without incurring addition loss of retention value (RV) from the media cluster 40, 40', 40" storing the replicas.

Management of Replicas of Assets on Media Clusters

The propagation service module 66 controls propagations of viewing assets to and among the media clusters 40, 40', 40". The propagation service module 66 propagates assets to increase the economic value of the entire collection of assets available to viewers. The economic value of propagating a particular asset to a particular media cluster 40, 40', 40" is rated by a total propagation priority (TPP). TPPs enable comparisons of the economic values of potential propagations of assets to particular media clusters 40, 40', 40" of the interactive television system 10.

The asset propagation process includes a process 100 that ranks potential propagations and a process 110 that selects which asset propagations to perform.

Figure 5A:
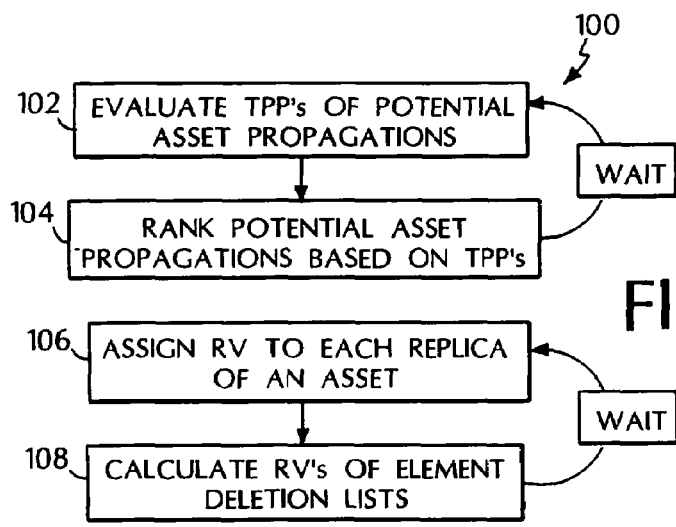
FIG. 5A is a flow chart for a process that ranks viewing assets and evaluates retention values of replicas of asset elements and entries in element deletion lists.

Referring to FIG. 5A, a flow chart for the ranking process 100 is shown. The process 100 evaluates the TPP of potential asset propagations (step 102). A potential asset propagation identifies an asset and a target media cluster 40, 40', 40" to which the identified asset can be propagated. The target cluster 40, 40', 40" does not already store a replica of the asset. Using the TPPs, the process 100 ranks the set of potential asset propagation in a list (step 104). Potential asset propagations with higher TPPs are ranked higher and correspond to propagations predicted to provide larger increases the economic value of the entire collection of replicas of assets stored on media clusters 40, 40', 40".

The ranking process 100 also assigns a retention value (RV) to each replica of an asset (step 106). The assigned RVs depend both on the asset and on the media cluster 40, 40', 40". The retention value, RV, indicates the value to the entire system 10 of keeping the associated replica of the asset on the associated media cluster 40, 40', 40". From the RVs of replicas of assets, the process 100 calculates the RVs of element deletion lists (step 108). Element deletion lists, which are described below, are groups of replicas of asset elements that can be deleted together. The ranking process 100 is repeated at regular intervals.

Figure 5B:
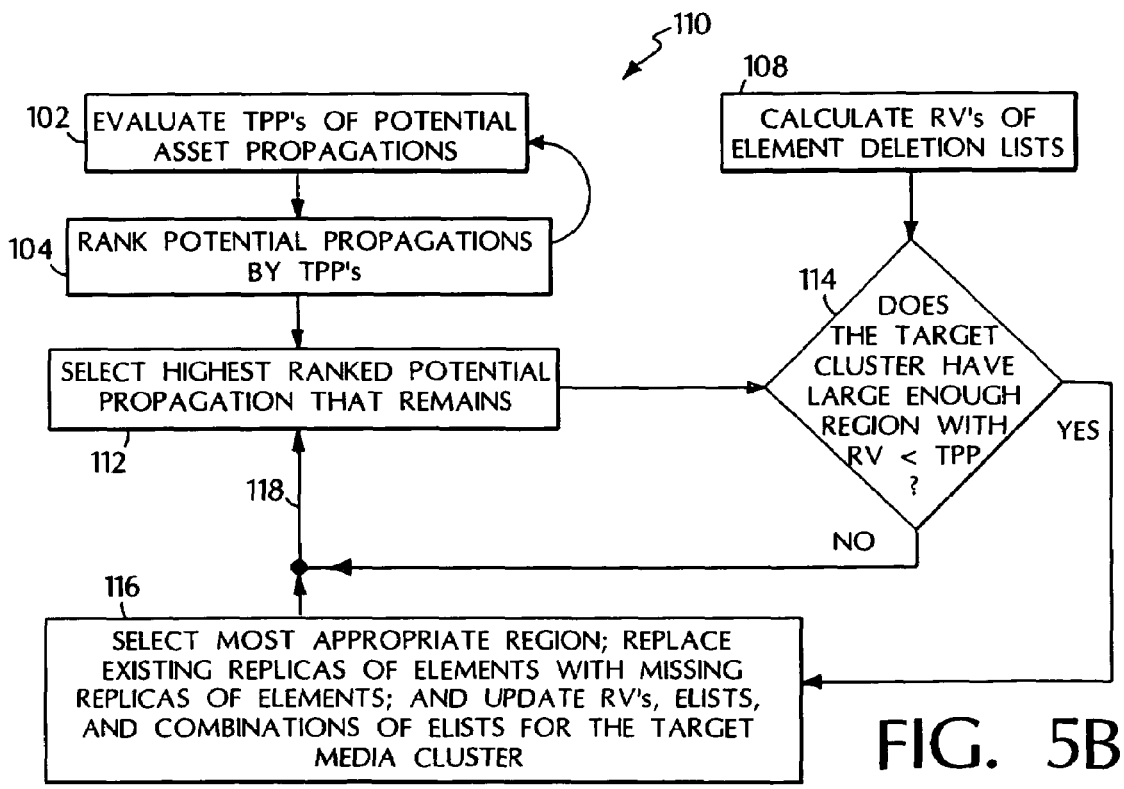
FIG. 5B is a flow chart for a process that decides whether to propagate a replica of an asset to a media cluster.

Referring to FIG. 5B, a flow chart for a propagation selection process 110 is shown. The process 110 selects the highest ranked potential asset propagation that remains on the ranking list (step 112). The selected potential propagation has the largest TPP among potential asset propagations, which have not already been processed. The process determines whether the associated target media cluster 40, 40', 40" of the selected potential asset propagation has a suitable storage region for a replica the asset (step 114). A suitable storage area is storage space that is large enough to store a replica of any elements of the asset not already on the target media cluster 40, 40', 40", i.e., any missing elements, and that has a total RV that is smaller than the TPP of the selected asset. If a suitable storage area exists, the process 110 selects the most appropriate region; orders copying of replicas of the missing elements of the selected asset from another media cluster 40, 40', 40" onto the most appropriate region; and then updates RVs, ELists, and combinations of ELists of the target cluster 40, 40', 40" (step 116). The most appropriate region has the smallest total RV value and among such regions the smallest size. The copying replaces existing replicas of the most appropriate region with missing replicas of the asset being propagated. After considering the selected propagation, the process 110 loops back 118 to select the remaining asset propagation on the ranking list having the next highest TPP.

Figure 6:
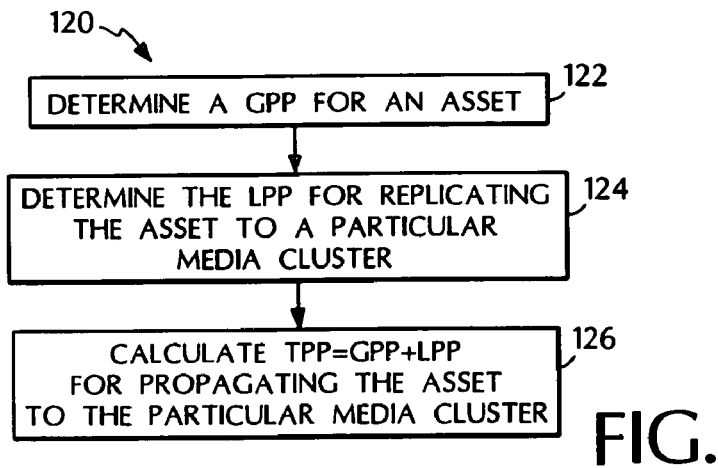
FIG. 6 is a flow chart illustrating a process that calculates total propagation priorities of replicas of assets.

FIG. 6 is a flow chart for a process 120 that calculates TPPs of potential asset propagations. The propagation service module 66 determines a global propagation priority (GPP) for a viewing asset, which is available for copying onto the media clusters 40, 40', 40" (step 122). The GPP is a time-dependent number, e.g., in the range of 0 to 100, that expresses the economic value of making a new replica of the associated asset available to viewers. The process 120 also determines a local propagation priority (LPP) for copying a replica of the asset onto a particular target media cluster 40, 40', 40" (step 122). The determination of an LPP is performed separately for each target media cluster on which the asset is not already stored. Finally, the process 120 adds the GPP and LPP to obtain the TPP associated with the asset and the particular target media cluster 40, 40', 40" (step 126).

Replication of an asset to a media cluster 40, 40', 40" involves copying replicas of the elements of the asset, which are not already present, onto the cluster's video data storage 36, 36', 36". On the same media cluster 40, 40', 40", replicas of different assets can share replicas of the asset elements. Thus, replicas of asset elements already on a media cluster are not recopied onto the cluster during propagation of the asset to the cluster. Copying entails pulling elements of the asset, which are not already on the cluster, from the video data storage 36, 36', 36" of another media cluster 40, 40', 40" and writing the pulled elements to the video data storage 36, 36', 36" of the target media cluster 40, 40', 40". After deciding to propagate an asset to a media cluster 40, 40', 40", the propagation service module 66 updates RVs of the replicas of assets and asset elements on the target cluster 40, 40', 40".

Figure 7:
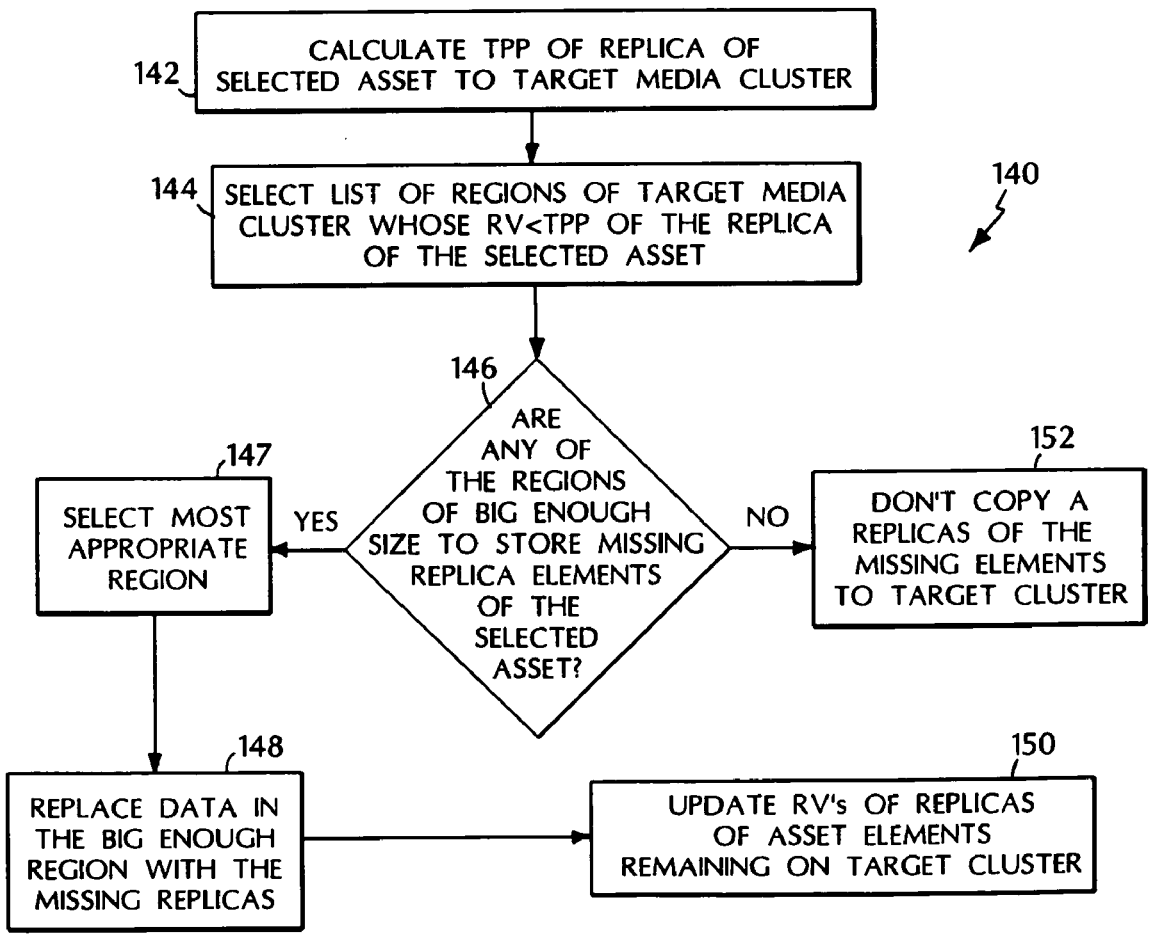
FIG. 7 is a flow chart illustrating a process that determines whether to copy a replica of a viewing asset onto a media cluster.

Referring to FIG. 7, a process 140 for determining whether to propagate a selected asset to a target media cluster 40, 40', 40" is shown. The propagation service module 66 calculates a TPP for a replica of the selected asset on the target media cluster 40, 40', 40" (step 142). The TPP is the sum of the asset's GPP for propagating a new replica of the asset on the system 10 and the LPP for having a replica of the selected asset on the particular media cluster 40, 40', 40".

The propagation service module 66 selects a list of regions, e.g., combinations of ELists, of the target media cluster 40, 40', 40" that have smaller RVs than the TPP for the selected asset (step 144). The propagation service module 66 determines whether any regions on the list have a size sufficient to store replicas of the elements of the selected asset that are not already stored on the media cluster 40, 40', 40", i.e., replicas of the missing elements (step 146). If at least one such region exists, the propagation service module selects the most appropriate one of such regions (step 147). The most appropriate region is a region with the smallest RV and among regions with the smallest RV, the most appropriate region has the smallest size. The propagation service module 66 replaces data in the selected region by replicas of the missing elements of the selected asset (step 148). The target region for the copying is the region from the list with the smallest RV and sufficient size to store the elements. During copying of the missing asset elements to the target cluster 40, 40', 40", the propagation service module 66 protects both source and destination replicas from deletion.

To copy the asset elements, the propagation service module 66 identifies a video data storage 36, 36', 36" of another media cluster 40, 40', 40" to act as a source for the elements being copied. The propagation service module 66 also fixes a minimum transfer rate for the elements being copied and protects the source and target from being overwritten during copying.

After ordering the replication of the selected asset, the propagation service module 66 also updates the RVs of replicas of asset elements remaining on the target media cluster 40, 40', 40" (step 150). Any replicas of asset elements not belonging to a full replica of an asset are updated to have RVs with low values, e.g., the value zero. Replicas of these asset elements will be the first elements removed to provide space for new replicas of assets.

If none of the listed regions has sufficient size to store the replicas of missing elements of the selected asset, the propagation service module 66 does not copy replicas of the missing asset elements to the target media cluster 40 (step 152).

Element Deletion Lists

Figure 8A:
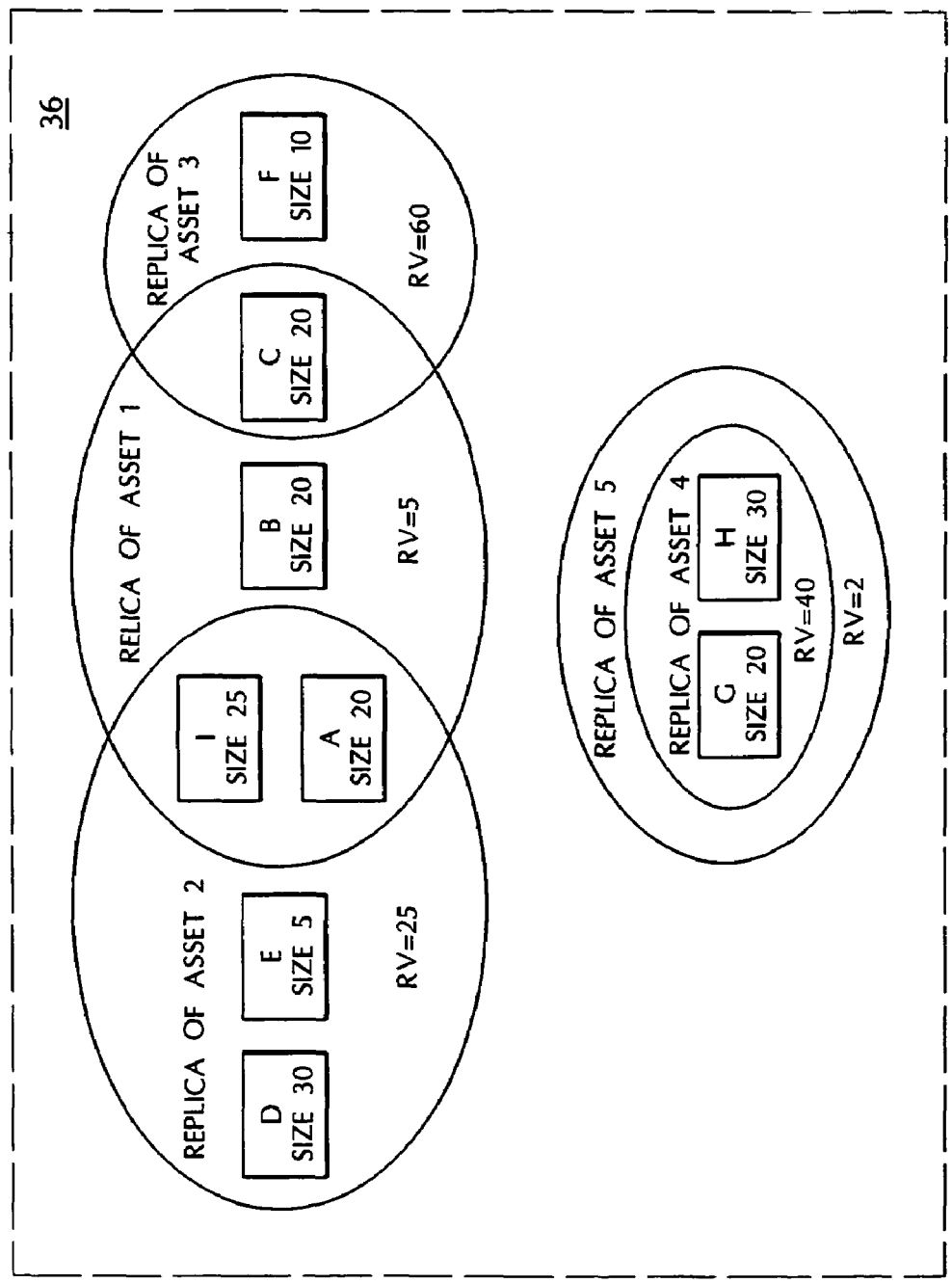
FIG. 8A illustrates relations between replicas of viewing assets and replicas of asset elements stored on a media cluster.

FIG. 8A is a snapshot showing relationships between data objects stored on the video data storage 36 of one media cluster 40 shown in FIG. 1. The data objects include replicas of asset elements A-H and replicas of assets 1-5, which are composed of the replicas of elements A-H. Each replica of an asset 1-4 has an associated RV, i.e., a number determining the asset replicas value with respect to being deleted. Each replica of an element A-H has an associated data size and an RV inherited from the assets to which the element belongs.

The replicas of elements A-H that belong to an asset are streamed from the media cluster 36 to a viewer in response to a viewing request. Thus, the absence of a replica of an element A-H belonging to the replica of the requested asset results in the asset being not streamable and thus, unusable for viewers. The deletion of the replica of any element A-H results in each replica of an asset 1-5, to which the deleted replica of the element A-H belonged, ceasing to exist. For this reason, the RV of a replica of an element is itself equal to a preselected combination of the RVs of the replicas of assets 1-5 to which the element A-H belongs, e.g., a sum of the RVs of replicas of such assets. For example, the shared element I has an RV of 30, which is the sum of the RVs of the replicas of assets 1 and 2 to which replica of element I belongs.

To free space on the video data storage 36, a replica of a selected element A-H can be deleted or overwritten. Each replica of an element A-H also defines an element deletion list (EList). An EList includes the additional replicas of elements A-H that can be deleted along with the selected replica of an element A-H without making additional replicas of assets of the media cluster 40 disappear. The EList of a selected asset includes replicas of all elements A-H that belong "only" to assets to which the selected replica of an element A-H belongs. For example, the EList for selected replica of an element H includes the replicas of elements H and G. The replica of element G belongs to this EList, because it belongs only to the replicas of assets 4, 5 to which the selected replica of element H also belongs. Deletion of all replicas of elements A-H of an EList does not produce more loss of RV for the media cluster 40 than the RV loss produced by only deleting the selected replica of element A-H defining the EList. On the other hand, deleting all the replicas of assets in the EList of a selected replica of an asset often liberates more space for writing new replicas of assets to the media cluster 40.

Figure 8B:
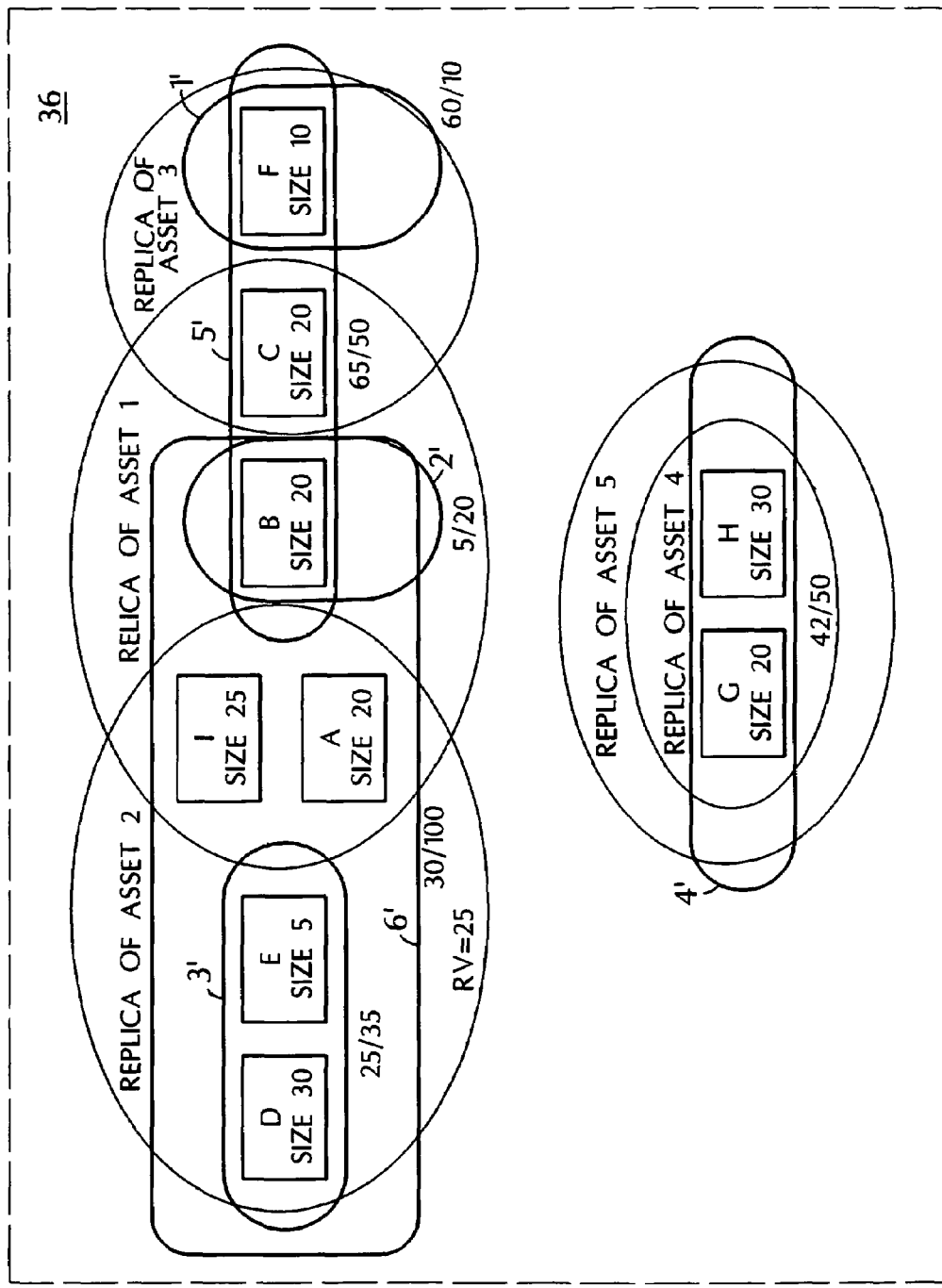
FIG. 8B illustrates ELists for the replicas of viewing assets and asset elements shown in FIG. 8A.

FIG. 8B illustrates the ELists 1'-6' for the replicas of elements A-H and replicas of assets 1-5 shown in FIG. 8A. For each EList 1'-6', an RV and a size can be defined. FIG. 8B shows RV and size of each EList by labels RV/size. The RV of an EList 1'-6' is the preselected combination of the RVs of the replicas of assets 1-5 to which the ELists 1'-6' selected replica of an element A-H belongs. The size of an EList 1'-6' is a sum of the data sizes of the replicas of elements A-H that belong to the EList 1'-6'.

FIG. 9A is a table 160 whose entries characterize the ELists 1'-6' of the video data storage 36, shown in FIGS. 8A-8B. Each entry of table 160 provides an RV, size, and a list of replicas of elements A-I for one of the ELists 1'-6'. The last column 162 of the table 160 indicates which replicas of assets 1-5 will cease to exist on the associated media cluster 40 if the EList 1'-6' associated with the entry is deleted.

Figures 8C, 8D:
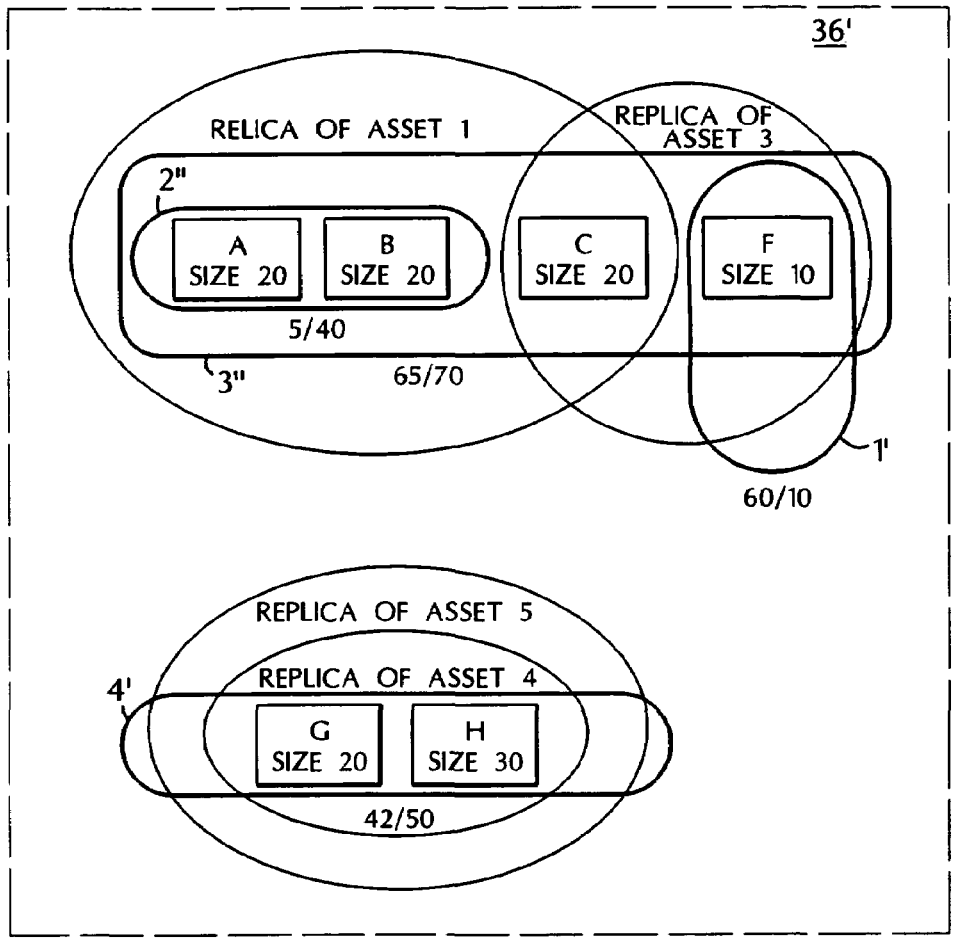
FIG. 8C illustrates replicas of assets, replicas of asset elements, and ELists that remain on the media cluster of FIG. 8A after deletion of the asset elements of one EList.
FIG. 8D is a table enumerating the ELists remaining in FIG. 8C.

FIG. 8C shows the data objects remaining on the video data storage 36 after deletion of EList 3', shown in table 160. After the deletion, remaining ELists 2", 3" have forms that differ from the forms of any ELists 1'-6' prior to the deletion. Table 160' of FIG. 8D characterizes the ELists 1', 2", 3", 4' that remain after the above-described deletion.

Elements from several ELists can be deleted together to free regions of the video data storage for replicas of new asset elements. FIG. 9B shows a table 160" that provides region economic values, i.e., total RVs, and sizes of "combinations of ELists", which are formed from the ELists 1'-6' shown in FIG. 8B. The region values and sizes are found by combining RVs, e.g., by summing, and summing sizes, respectively, for the ELists 1'-6' belonging to the combinations. The table 160" lists the "combinations of ELists" in order of increasing replacement value up to a value of 50 where 50 is the largest TPP of assets currently under consideration for propagation.

From the ELists, the propagation service module 66 produces a table listing "combinations of ELists" for the media cluster 40. The table lists "combinations of ELists" whose total RVs are smaller than the maximum TPP of any asset being currently considered for propagation to the target cluster 40. To create the table, the propagation service module 66 searches the media cluster's table of ELists for combinations of ELists whose combined RVs are smaller than the maximum TPP of any asset considered for propagation to the target media cluster 40. Limiting searches to this upper bound on RVs reduces the number of "combinations of ELists" for which the propagation service module 66 needs to determine a total RV or region economic value.

Figure 10:
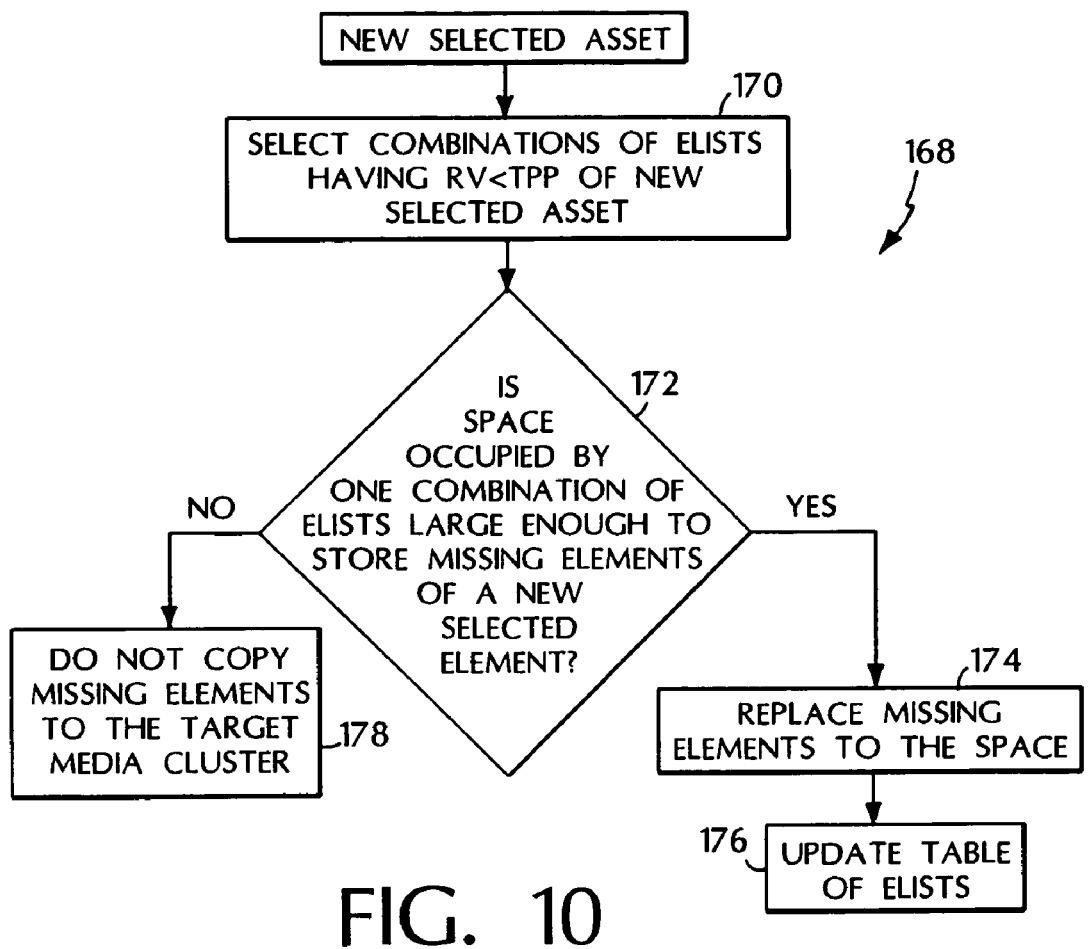
FIG. 10 is a flow chart illustrating a process that uses ELists to free space for propagating replicas of new assets.

FIG. 10 is a flow chart for a process 168 that decides whether a target media cluster 40, 40', 40" has space for a replica of a new selected asset not presently on the cluster 40, 40', 40". From the table listing "combinations of ELists", the process 168 selects the entries whose RVs are smaller than the TPP of the new selected asset (step 170). From these entries, the propagation service module 66 searches for a "combination of ELists" that that occupy space large enough to store the replicas of elements of the selected new asset, which are not already on the media cluster (step 172). If several one or more such combinations exist, the propagation service module 66 selects the "combination of ELists" whose RV is smallest. Among the combinations of ELists with smallest RVs, the propagation service module 66 selects the combination having the smallest data size, i.e., this combination of ELists defines the most appropriate storage region to delete. The data size must be sufficient to store replicas of elements of the selected new asset not already on the target media cluster 40, 40', 40". If the sought "combination of ELists" exists, the propagation service module 66 replaces elements of the new selected asset, not already on the media cluster, to the region previously occupied by the sought combination of ELists (step 174). After performing the copying, the propagation service module 66 updates RV of replicas of elements and asset elements on the media cluster 40, 40', 40" and the table of ELists (step 176). If the sought combination of ELists does not exist, the propagation service module 66 does not copy missing elements of the new selected asset to the target media cluster 40, 40', 40" (step 178).

Global and Local Propagation Priorities

The TPP for replicating an asset is a sum of a global propagation priority (GPP) and a local propagation priority. The GPP is independent of target media cluster 40, 40', 40". The LPP depends on the target media cluster 40, 40', 40".

Each GPP is a sum of several components, which may take values from 0 to 100. Each component may separately vary in time thereby changing the probability of propagating a replica of the asset to new media clusters 40, 40', 40".

Figure 11:
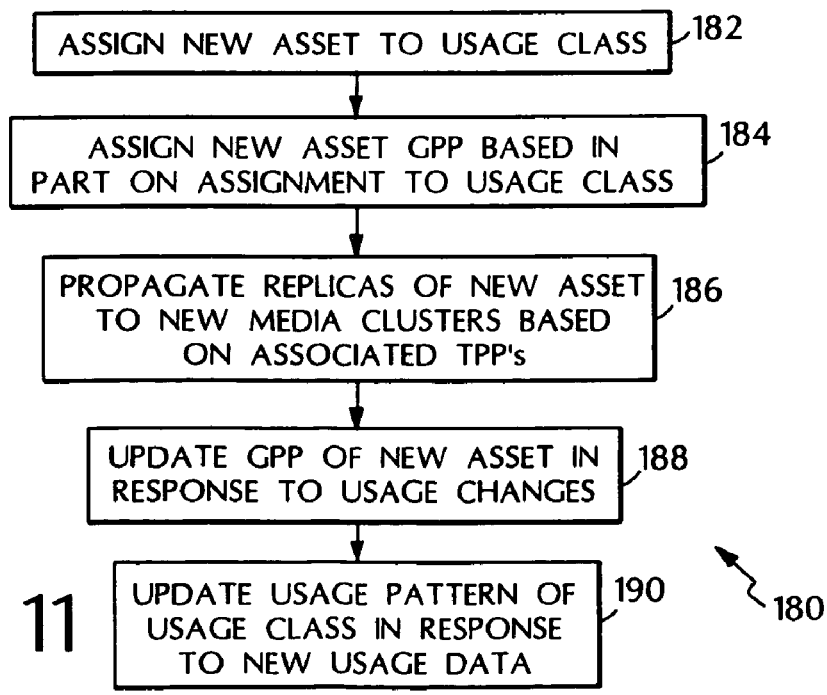
FIG. 11 is a flow chart illustrating a process that initially defines and subsequently updates a new asset's global propagation priority.

FIG. 11 shows a flow chart for a process 180 that initially defines and subsequently updates the GPP of a new asset. When a new asset first becomes active in the system 10, the process 180 assigns the new asset to a usage class of similar assets (step 182). Membership to usage classes may be based on an asset's genre, e.g., a subject classification such as newly released movies or sports events, or may be based on other criteria such as anticipated popularity. The process 180 assigns an initial GPP to the new asset based, in part, on the usage class of which the asset is a member (step 184).

After being assigned a GPP, replicas of the new asset may be propagated to new media clusters 40, 40', 40" based on the TPP, i.e., the TPP=GPP+LPP (step 186). While the asset is available to viewers, the associated GPP is updated over time to match the actual viewer usage (step 188). Media clusters 40, 40', 40" having replicas of assets report usage data to the connection management module 68, which reports the data to propagation service module 66. Using the data, the propagation service module 66 recalculates the GPP of the asset.

Since the updated GPP partially determines to which media clusters 40, 40', 40" an asset propagates, the distribution of the asset on the media clusters 40, 40', 40" changes in response to usage data fed back to the propagation service module 66. Gradually, the GPP is adjusted to reflect, in part, relative viewer requests for the asset as compared to viewer requests for other assets.

The propagation service module 66 uses usage data to update the value of the usage pattern of the usage class to which the asset is a member (step 190).

The viewer usage data may be determined from values of counters 162, shown in FIG. 3, associated with individual assets. The counters 162 record demands for individual ones of the assets. The usage data accumulated by these counters 162 is described below.

One of the counters 162 measures use of each asset during specific times of week. A set of accumulators is maintained to actually indicate use of each asset during every 2 hour interval of the week. For example, one of these counters may store data indicating that the Tuesday night news is most requested on Wednesday morning. The accumulator corresponding to the current time of week is one of the counters 162. The usage data for a usage class, as described above, for a new asset is maintained by an analogous set of counters and accumulators.

Usage data is accumulated on short-term viewer demand, medium-term viewer demand, total number of viewer requests, and last-request-time for each asset. The counters 162 (FIG. 3) accumulate usage data, which are associated with individual replicas of assets on media clusters 40, 40', 40".

Another of the counters 162 measures the "short-term demand" for an associated asset by counting each viewer request for the asset. The propagation service module 66 may decrement this counter 162 by a fixed amount every few hours or perform another counter correction to make the counter's total count indicative of the number of "recent" requests. The count is never decremented to negative values. If the accumulated count is high, the propagation priority, i.e., value of putting another replica of the asset onto a media cluster 40 is high, and the propagation service module 66 increases the asset's TPP.

The medium-term demand for each asset is measured by seven of the counters 162, which accumulate numbers of demands for the asset over weeklong periods. The period of each counter ends on different day. For each counter, the count from the present week is compared to the count from the same counter for the last week. A decrease in this count indicates a declining interest for the asset, and the propagation service module 66 reduces the GPP of the asset in response to such decreases.

Other counters 162 measure the total number of requests and time of the last request for each asset. These counts track popularities of assets. The total number of requests may be used to update the GPP of the asset to generally reflect its popularity. The lengths of time since last request for different assets are compared to determine relative asset popularities.

The GPP of an asset may depend on other components. One component measures whether an asset is a rapid mover, e.g., an asset whose usage changes suddenly. Another component raises the GPP of assets for which only one replica exists. This favorizes generation of a second replica, which is valuable to the system to avoid failures. Another component raises the GPP of assets whose one or more replicas are only accessible through heavily loaded delivery networks. This favors adding a second replica, which can offset unavailability of the asset caused by other video streaming traffic.

The LPP assigned to a replica of an asset is also a sum of several components, but the components depend on properties of a server's local environment. Each of the components may take a value in a preselected range, e.g., 0 to 100. The components contributing to LPP cause the propagation service module 66 to distribute replicas of assets to media clusters a manner that accounts, in part, for local viewing preferences.

One component of LPPs depends on the classification of an asset, e.g., genre and language. This component causes distributions of replica of assets to accord with local preferences of viewers and may be updated by historical viewing data. Counters 162 of the propagation service module 66 accumulate numbers of viewer requests for various classes of assets for use in determining the value of this component.

Another component of LPPs depends on whether multiple replicas of the asset are stored on the set of media clusters 40, 40', 40". This component is high for clusters 40, 40', 40" not storing a replica of the asset if a replica of the asset is only on one cluster 40, 40', 40". This component stimulates the propagation service module 66 to replicate each asset present on one media cluster 40, 40', 40" onto a second media cluster 40, 40', 40". The second replica helps to avoid delivery failures caused by hardware failures.

Another component to LPPs depends on activity levels of media clusters 40 increasing the LPP for replicas of new assets only located on other media clusters 40, 40', 40" that are heavily loaded. The component causes the propagation service module 66 to copy a replica of the asset to a less busy media cluster 40, 40', 40" if current replicas of the asset are on media clusters 40 operating at near capacity. The propagation service module 66 uses delivery pathway data from the connection manager 68 to determine whether media clusters 40, 40', 40" are operating at near capacity.

Another component to LPPs depends on activity levels of delivery pathways. This component causes the propagation service module 66 to copy a replica of an asset onto a media cluster 40 that is connected to a node group 20, 20', 20", 20'" by less burdened delivery pathway if the presently usable delivery pathways are near capacity. The loading of each delivery pathway is determined by the connection manager 68, which provides an abstracted view of the deliver pathways to the propagation service module 66.

Another component to LPPs causes the propagation service module 66 to copy a replica of an asset to a new media cluster 40, 40', 40" if present replicas are inaccessible to some users. The inaccessibility may result from the absence of delivery pathways from the clusters 40, 40', 40" presently storing a replica of the asset and the node groups 20, 20', 20", 20'" without access.

In various embodiments, other historical usage data is used to set the values of the GPPs and LPPs of potential propagations. The propagation of viewing assets to media clusters 40, 40', 40' is calculated to increase the total economic value of the assets to the system 10, e.g., by increasing viewer payments for movie rentals. As viewer demands change, the propagation priorities assigned to replicas of assets are updated to follow the changing demands. Asset propagation evolves the distribution of replicas of the assets on the media clusters 40, 40', 40" in response to the updates to GPP and LPP. Thus, changes in viewing preferences automatically induce an evolution in the distribution of viewing assets and, at least partially, follows the viewing preferences.

The retention values (RVs) assigned to replicas of assets and to replicas of asset elements, which are both stored on the media clusters 40, 40', 40", are calculated and updated through processes analogous to the processes used to determine the TPP. The RV may be a sum of a global value and a local value. The global value indicates an economic value associated with retaining the present set of replicas of the asset on the entire collection of media clusters 40, 40', 40". The local value indicates an economic value associated with retaining the replica of the asset on a particular associated media cluster 40, 40', 40". Both the local and global values may be sums of components of the same types as the components contributing to LPP and GPP, but coefficients may vary. The global and local values may depend on collected usage data and be assigned to usage classes that contribute to defining initial values.

Other additions, subtractions, and modifications of the described embodiments may be apparent to one practiced in this field.

What is claimed is:

1. A process of propagating viewing assets to a system of video servers, the process comprising:
   generating a propagation priority for a selected viewing asset that comprises a set of asset elements, each asset element of the set comprising a segment of multimedia data, the propagation priority representing a predicted economic value of propagating the selected viewing asset to a target video server, the propagation priority comprising a first priority associated with the viewing asset and a second priority associated with the target video server;
   generating a retention value for each replica of a viewing asset presently stored on the target video server, each retention value representing a predicted economic value of retaining the asset replica on the target video server, each asset replica comprising a set of asset element replicas stored on the target video server;
   generating a set of element deletion lists, each element deletion list identifying a set of asset element replicas that comprise a set of asset replicas presently stored on the target video server and capable of being removed from the target video server as a group, each element deletion list being associated with a sum of retention values associated with the corresponding set of asset replicas;
   selecting one or more element deletion lists having a data size at least as large as a data size of one or more asset elements of the selected viewing asset;
   comparing the propagation priority of the selected viewing asset against the sum of retention values associated with the one or more selected element deletion lists; and
   copying the one or more asset elements of the selected viewing asset to the target video server in response to determining that the propagation priority of the selected viewing asset exceeds the sum of retention values of the one or more selected element deletion lists.

2. The process of claim 1, wherein copying the one or more asset elements comprises writing the one or more asset elements of the selected viewing asset onto a storage region of the target video server on which is already stored a replica of one or more viewing assets.

3. The process of claim 1, wherein copying the one or more asset elements of a selected viewing asset includes the copying of a missing portion from one or more video servers.

4. The process of claim 1, further comprising:
   assigning propagation priorities to a plurality of viewing assets;
   ranking the viewing assets according to the assigned priorities; and
   selecting an asset in response to the asset having a rank higher than a preselected minimum rank.

5. The process of claim 1, further comprising: updating retention values of replicas of viewing assets remaining on the target server in response to the copying of the one or more asset elements of the selected viewing asset.

6. The process of claim 1, further comprising selecting the viewing assets to include video files for at least one of the movies, news emissions, and shopping emissions.

7. The process of claim 1, wherein the replica of one or more viewing assets includes a replica of an asset element shared by replicas of two assets on the target server.

8. The process of claim 1,
   wherein the second priority is calculated based on replicas available to the target video server, load on the target video server, availability of alternative delivery paths to stream the selected viewing asset to users other than the target video server, processing speed available to the target video server, or any combination thereof, and the process further comprising:
   ranking the viewing assets based on the assigned propagation priorities; and
   propagating, to zero or more of the video servers, those viewing assets according to rank.

9. The process of claim 8, wherein generating a propagation priority includes:
   assigning a viewing asset to a usage class, the usage class providing a portion of an initial value for propagation priorities associated with assets assigned to the class.

10. The process of claim 8, further comprising:
    accumulating usage data on individual assets stored on the video servers; and
    updating the propagation priorities based on the usage data.

11. The process of claim 10, wherein the usage data included data indicative of viewer demand and data indicative of change in viewer demand.

12. The process of claim 10, further comprising: updating the propagation priority of a particular asset in a usage class based on a difference between a usage level of the usage class and a usage level of the particular asset determined from the accumulated usage data.

13. The process of claim 8, wherein the viewing assets include encoded digital video assets, encoded digital audio assets, or combinations of both encoded digital video assets and encoded digital audio assets.

14. The process of claim 8, further comprising: streaming a replica of the copied one of the assets from the particular video server to a television of a viewer in response to receiving a request to deliver the asset.

15. The process of claim 8, wherein the first priority is based in part on a counter value, the counter value measuring usage of the selected one of the assets.

16. The process of claim 8, wherein the second priority is based in part on a bandwidth for streaming the selected viewing asset from the target video server to a set of viewers.

17. The process of claim 1, wherein the retention value comprises:
    a first value associated with the viewing asset and indicative of an economic value of retaining a set of replicas of the viewing asset on the video servers; and
    a second value associated with the target video server and indicative of an economic value of retaining the set of replicas on the target video server.

18. The process of claim 1, wherein the first priority is calculated based on one or more first components associated with a user demand for the selected asset.

19. The process of claim 18, wherein the one or more first components comprise short-term viewer demand, medium-term viewer demand, total number of requests, last-request-time, usage class data, or any combination thereof.

20. The process of claim 19, wherein each of the one or more first components is associated with a coefficient indicative of an importance associated with a particular first component.

21. The process of claim 20, wherein the coefficient associated with each of the one or more first components can be configured by a user.

22. The process of claim 1, wherein the second priority is calculated based on one or more second components associated with a local environment of the target video server.

23. The process of claim 22, wherein the one or more second components comprise asset classification, number of replicas available to the target video server, number of replicas stored on the target video server, load on the target video server, available delivery paths to stream the selected asset to users, available bandwidth between the target video server and users, processing speed available to the target video server, or any combination thereof.

24. The process of claim 23, wherein each of the one or more second components is associated with a coefficient indicative of a weight associated with a particular second component.

25. The process of claim 24, wherein the coefficient associated with each of the one or more second components can be configured by a user.

26. The process of claim 1, wherein the retention value comprises a third priority associated with the one or more viewing assets and a fourth priority associated with the target video server.

27. A process of propagating viewing assets to a target video storage, the process comprising:
assigning propagation priorities to viewing assets, each viewing asset comprises a set of asset elements, each asset element of the set comprising a segment of multimedia data, each of the propagation priorities being predictive of an economic value associated with propagating a viewing asset to a target video storage, each of the propagation priorities comprising a first priority associated with the viewing asset and a second priority associated with the target video storage;
constructing a table of element deletion lists for the target video storage, each of the element deletion lists identifying a set of replicas of asset elements that are capable of being removed from the target video storage as a group, each of the element deletion lists being associated with a retention value;
selecting at least one of the element deletion lists from the table, the selected element deletion list having a data size at least as large as a data size of a portion of a replica of another viewing asset not stored on the target video storage;
comparing a propagation priority of a viewing asset against the retention value of the selected element deletion list; and
copying the portion of the replica of the viewing asset onto the target video storage in response to the propagation priority of the viewing asset exceeding a retention value of the selected element deletion list.

28. The process of claim 27, wherein copying the portion of the replica comprises writing the portion onto a region of the target video storage previously storing the group.

29. The process of claim 27, wherein selecting at least one element deletion list includes constructing a table that lists sets of element deletion lists with lower retention value than the propagation priority of the asset.

30. The process of claim 29, wherein selecting at least one element deletion list includes picking one of the lists having a data size at least as large as the portion of the replica on the asset.

31. The process of claim 27, further comprising: updating the table of element deletion lists—after copying the portion of the replica of the asset.

32. The process of claim 27, wherein each element deletion list includes a set of replicas of asset elements that are shared by the same assets.

33. A process of distributing viewing assets to viewers, the process comprising:
assigning propagation priorities to viewing assets, each viewing asset comprises a set of asset elements, each asset element of the set comprising a segment of multimedia data, the propagation priorities being predictive of an economic value associated with distributing the viewing assets to a plurality of video servers accessible to viewers, each of the propagation priorities comprising a first priority associated with a viewing asset and a second priority associated with one of the plurality of video servers;
selecting a target video server;
assigning a retention value to a set of replicas of viewing assets stored on the target video server, the retention value representing a predicted economic value of retaining the set of replicas on the target video server, each asset replica comprising a set of asset element replicas stored on the target video server;
generating a set of element deletion lists, each element deletion list identifying a set of asset element replicas that comprise a set of replicas of viewing assets presently stored on the target video server and capable of being removed from the target video server as a group, each element deletion list being associated with a sum of retention values associated with the corresponding set of replicas of viewing assets;
selecting one or more element deletion lists having a data size at least as large as a data size of one or more asset elements of a selected viewing asset;
comparing a propagation priority associated with the selected viewing asset against the sum of retention values associated with the one or more element deletion lists; and
copying the one or more asset elements of the selected viewing asset onto the target video server in response to determining that the propagation priority of the selected viewing asset exceeds the sum of retention values associated with the one or more element deletion lists.

34. The process of claim 33, wherein copying the one or more asset elements of the selected viewing asset includes searching for one or more sets of replicas of asset elements to delete from the set of element deletion lists.

35. The process of claim 33, further comprising: updating the retention values in response to anticipated changes in viewer request levels for assets.

36. The process of claim 35, further comprising: accumulating data on usage of individual ones of the assets, and updating the retention values based on least in part on the accumulated data.

37. An interactive television system, comprising:
a communication channel selected from the group comprising a network or a bus;

a plurality of video servers to store digital replicas of viewing assets for viewers, each viewing asset comprises a set of asset elements, each asset element of the set comprising a segment of multimedia data, the video servers being connected by the communication channel; and a control unit connected to the video servers and configured to:

generate a propagation priority for a selected viewing asset, the propagation priority representing a predicted economic value of propagating the selected viewing digital asset to the target server, the propagation priority comprising a first priority associated with the viewing asset and a second priority associated with the target server, generate a retention value for each replica of a viewing asset presently stored on the target server, each retention value representing a predicted economic value of retaining the asset replica on the target server, each asset replica comprising a set of asset element replicas stored on the target server, generate a set of element deletion lists, each element deletion list identifying a set of asset element replicas that comprise a set of asset replicas presently stored on the target server and capable of being removed from the target video as a group, each element deletion list being associated with a sum of retention values associated with the corresponding set of asset replicas, select one or more element deletion lists having a data size at least as large as a data size of one or more asset elements of the selected viewing asset, compare the propagation priority of the selected viewing asset against the sum of retention values associated with the one or more selected element deletion lists, and copy the one or more asset elements of the selected viewing asset to the target server in response to determining that the propagation priority of the selected viewing asset exceeds the sum of retention values of the one or more selected element deletion lists.

38. The system of claim 37, wherein the control unit is further configured to record usage data for the assets stored on each of the local video storages.

39. The system of claim 37, further comprising: a plurality of distribution networks to provide channels for delivering viewing assets to viewer televisions, each distribution network connected to a subset of the video servers.

40. The system of claim 37, wherein the control unit is configured to accumulate usage data on viewing assets from the video servers.

41. A computer readable medium encoded with computer executable instructions being executed by data processing apparatus to execute the process of claim 1.

42. A computer readable medium encoded with computer executable instructions being executed by data processing apparatus to execute the process of claim 3.

43. A computer readable medium encoded with computer executable instructions being executed by data processing apparatus to execute the process of claim 4.

44. A computer readable medium encoded with executable instructions being executed by data processing apparatus to execute the process of claim 5.

45. A computer readable medium encoded with executable instructions being executed by data processing apparatus to execute the process of claim 8.

46. A computer readable medium encoded with executable instructions being executed by data processing apparatus to execute the process of claim 9.

47. A computer readable medium encoded with computer executable instructions being executed by data processing apparatus to execute the process of claim 10.

48. A computer readable medium encoded with computer executable instructions being executed by data processing apparatus to execute the process of claim 11.

49. A computer readable medium encoded with computer executable instructions being executed by data processing apparatus to execute the process of claim 12.

50. A computer readable medium encoded with computer executable instructions being executed by data processing apparatus to execute the process of claim 14.

51. A computer readable medium encoded with computer executable instructions being executed by data processing apparatus to execute the process of claim 27.

52. A computer readable medium encoded with computer executable instructions being executed by data processing apparatus to execute the process of claim 29.

53. A computer readable medium encoded with computer executable instructions being executed by data processing apparatus to execute the process of claim 30.

54. A computer readable medium encoded with computer executable instructions being executed by data processing apparatus to execute the process of claim 32.

55. A process for propagating viewing assets, the process comprising:

generating a propagation priority for a selected viewing asset that comprises a set of asset elements, each asset element of the set comprising a segment of multimedia data, the propagation priority representing a predicted economic value of propagating the selected viewing asset to storage of a target device, the propagation priority comprising a first value associated with the viewing asset and a second priority associated with the target device;

generating a retention value for each replica of a viewing asset presently stored on the target device, each retention value representing a predicted economic value of retaining the asset replica on the target device, each asset replica comprising a set of asset element replicas stored on the target device;

generating a set of element deletion lists, each element deletion list identifying a set of asset element replicas that comprise a set of asset replicas presently stored on the target device and capable of being removed from the target video server as a group, each element deletion list being associated with a sum of retention values associated with the corresponding set of asset replicas;

selecting one or more element deletion lists having a data size at least as large as a data size of one or more asset elements of the selected viewing asset;

comparing the propagation priority of the selected viewing asset against the sum of retention values associated with the one or more selected element deletion lists; and copying the one or more asset elements of the selected viewing asset to the storage of the target device in response to determining that the propagation priority of the selected viewing asset exceeds the sum of retention values of the one or more selected element deletion lists.

56. The process of claim 55, wherein copying the one or more asset elements further comprises: writing the one or more asset elements of the selected viewing asset onto a portion of the storage medium of the target device on which is previously stored a portion of the replica of one or more viewing assets.

57. The process of claim 55, wherein copying the one or more asset elements of a selected viewing asset further comprises: copying the one or more asset elements from one or more storage devices.

58. The process of claim 55, wherein copying the one or more asset elements of a selected viewing asset further comprises: copying the one or more asset elements from one or more video servers.

59. The process of claim 55, further comprising:
assigning propagation priorities to a plurality of viewing assets;
ranking the viewing assets according to the assigned propagation priorities; and
selecting an asset in response to the asset having a rank exceeding a preselected rank.

60. The process of claim 55, further comprising selecting the target device to be a target video asset device.

61. The process of claim 55, wherein each asset replica stored on the target device comprises a set of asset element replicas belonging to at least one element deletion list.

62. The process of claim 55, further comprising: updating retention values of replicas of viewing assets remaining on the target device in response to the copying.

63. The process of claim 55, further comprising selecting the viewing assets to include digital information for at least one of movies, news emissions, and shopping emissions.

64. The process of claim 55, further comprising selecting viewing assets to include information represented as encoded data files.

65. The process of claim 55,
wherein the second priority is calculated based on replicas available to the target video server, load on the target device, availability of alternative delivery paths to stream the selected asset to users other than the target device, processing speed available to the target device, or any combination thereof, and the process further comprising:
ranking the assets based on the assigned priorities; and
propagating zero or more of the assets to one or more of the target devices according to rank.

66. The process of claim 65, wherein generating propagation priorities comprises:
assigning a viewing asset to a usage class, the usage class providing a portion of an initial value for the first priority of assets assigned to that class.

67. The process of claim 65, further comprising:
accumulating usage data on individual assets stored on the target devices; and
updating the propagation priorities based on the usage data.

68. The process of claim 65, wherein the viewing assets include at least one of encoded digital viewing assets and encoded digital audio assets.

69. A process for propagating digital viewing assets to video servers comprising:
assigning one or more propagation priorities to each of a plurality of digital viewing assets, each digital viewing asset comprises a set of digital asset elements, each digital asset element of the set comprising a segment of multimedia data, the one or more propagation priorities for a corresponding viewing asset being indicative of an economic value of propagating the viewing asset onto one or more video servers, each propagation priority comprising a first priority associated with the viewing asset and a second priority associated with a corresponding target video server, wherein the first priority is calculated based on short-term viewer demand, medium-term viewer demand, usage class data, or any combination thereof;
generating a set of element deletion lists, each element deletion list identifying a set of asset element replicas that comprise a set of asset replicas presently stored on a target video server and capable of being removed from the target video server as a group, each element deletion list being associated with a sum of retention values associated with the corresponding set of asset replicas;
selecting one or more element deletion lists having a data size at least as large as a data size of one or more asset elements of the selected viewing asset;
comparing the propagation priority of the selected viewing asset against the sum of retention values associated with the one or more selected element deletion lists;
ranking the viewing assets based on the assigned propagation priorities; and
propagating, to zero or more of the video servers, those viewing assets according to rank.

70. A system for propagating digital viewing assets to video servers comprising:
means for assigning one or more propagation priorities to each of a plurality of digital viewing assets, each digital viewing asset comprises a set of digital asset elements, each digital asset element of the set comprising a segment of multimedia data, the one or more propagation priorities for a corresponding viewing asset being indicative of an economic value of propagating the viewing asset onto one or more video servers, each propagation priority comprising a first priority associated with the viewing asset and a second priority associated with a corresponding target video server, wherein the first priority is calculated based on short-term viewer demand, medium-term viewer demand, usage class data, or any combination thereof;
means for generating a set of element deletion lists, each element deletion list identifying a set of asset element replicas that comprise a set of asset replicas presently stored on a target video server and capable of being removed from the target video server as a group, each element deletion list being associated with a sum of retention values associated with the corresponding set of asset replicas;
means for selecting one or more element deletion lists having a data size at least as large as a data size of one or more asset elements of the selected viewing asset;
means for comparing the propagation priority of the selected viewing asset against the sum of retention values associated with the one or more selected element deletion lists;
means for ranking the viewing assets based on the assigned propagation priorities; and
means for propagating, to zero or more of the video servers, those viewing assets according to rank.

71. A process for propagating digital viewing assets to target devices comprising:
assigning propagation priorities a plurality of digital viewing assets, each digital viewing asset comprises a set of digital asset elements, each digital asset element of the set comprising a segment of multimedia data, each of the propagation priorities being predictive of an economic value of propagating a particular asset to a particular target device, each propagation priority comprising a first priority associated with the particular asset and a second priority associated with the particular target device, wherein the first priority is calculated based on short-term viewer demand, medium-term viewer demand, usage class data, or any combination thereof;

generating a set of element deletion lists, each element deletion list identifying a set of asset element replicas that comprise a set of asset replicas presently stored on a target device and capable of being removed from the target device as a group, each element deletion list being associated with a sum of retention values associated with the corresponding set of asset replicas;

selecting one or more element deletion lists having a data size at least as large as a data size of one or more asset elements of the selected viewing asset;

comparing the propagation priority of the selected viewing asset against the sum of retention values associated with the one or more selected element deletion lists;

ranking the assets based on the assigned priorities; and propagating zero or more of the assets to one or more of the target devices according to rank.

72. A system for propagating digital viewing assets to target devices comprising:

means for assigning propagation priorities a plurality of digital viewing assets, each digital viewing asset comprises a set of digital asset elements, each digital asset element of the set comprising a segment of multimedia data, each of the propagation priorities being predictive of an economic value of propagating a particular asset to a particular target device, each propagation priority comprising a first priority associated with the particular asset and a second priority associated with the particular target device, wherein the first priority is calculated based on short-term viewer demand, medium-term viewer demand, usage class data, or any combination thereof;

means for generating a set of element deletion lists each element deletion list identifying a set of asset element replicas that comprise a set of asset replicas presently stored on a target device and capable of being removed from the target device as a group, each element deletion list being associated with a sum of retention values associated with the corresponding set of asset replicas;

means for selecting one or more element deletion lists having a data size at least as large as a data size of one or more asset elements of the selected viewing asset;

means for comparing the propagation priority of the selected viewing asset against the sum of retention values associated with the one or more selected element deletion lists;

means for ranking the assets based on the assigned priorities; and means for propagating zero or more of the assets to one or more of the target devices according to rank.

* * * * *